(12) United States Patent
Reijonen et al.

(10) Patent No.: US 8,866,068 B2
(45) Date of Patent: Oct. 21, 2014

(54) ION SOURCE WITH CATHODE HAVING AN ARRAY OF NANO-SIZED PROJECTIONS

(71) Applicant: Schlumberger Technology Corporation, Sugar Land, TX (US)

(72) Inventors: Jani Reijonen, Princeton, NJ (US); Luke Perkins, Plainsboro, NJ (US); Harold Pfutzner, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/728,950

(22) Filed: Dec. 27, 2012

(65) Prior Publication Data

US 2014/0183348 A1     Jul. 3, 2014

(51) Int. Cl.
*G01V 5/00*     (2006.01)
*H01J 27/20*    (2006.01)
*G01V 5/08*     (2006.01)

(52) U.S. Cl.
CPC ............ *H01J 27/205* (2013.01); *G01V 5/085* (2013.01)
USPC ...................................................... 250/256

(58) Field of Classification Search
CPC ..... H05H 13/02; H05H 13/005; H05H 15/00; H05H 7/00; H01J 37/08; H01J 2237/0807
USPC ...................................................... 250/256
See application file for complete search history.

(56) References Cited

U.S. PATENT DOCUMENTS

| | | | |
|---|---|---|---|
| 3,970,887 A | 7/1976 | Smith et al. | |
| 4,141,405 A | 2/1979 | Spindt | |
| 4,311,912 A * | 1/1982 | Givens | 376/109 |
| 4,798,959 A | 1/1989 | Marks | |
| 4,874,981 A | 10/1989 | Spindt | |
| 5,070,282 A | 12/1991 | Epsztein | |
| 5,204,581 A | 4/1993 | Andreadakis et al. | |

(Continued)

FOREIGN PATENT DOCUMENTS

| | | |
|---|---|---|
| EP | 564926 B1 | 6/1996 |
| EP | 278405 B1 | 8/1996 |

(Continued)

OTHER PUBLICATIONS

Sheridan et al., "A carbon nano tube electron impact ionisation source for low-power, compact spacecraft mass spectrometers," 2012, Advances in Space Research, vol. 49, pp. 1245-1252.*

(Continued)

*Primary Examiner* — Kiho Kim
(74) *Attorney, Agent, or Firm* — Cathy Hewitt; Jeremy Berman

(57) ABSTRACT

An ion source for use in a particle accelerator includes at least one cathode. The at least one cathode has an array of nano-sized projections and an array of gates adjacent the array of nano-sized projections. The array of nano-sized projections and the array of gates have a first voltage difference such that an electric field in the cathode causes electrons to be emitted from the array of nano-sized projections and accelerated downstream. There is a ion source electrode downstream of the at least one cathode, and the at least one cathode and the ion source electrode have the same voltage applied such that the electrons enter the space encompassed by the ion source electrode, some of the electrons as they travel within the ion source electrode striking an ionizable gas to create ions.

26 Claims, 7 Drawing Sheets

(56) References Cited

U.S. PATENT DOCUMENTS

| | | |
|---|---|---|
| 5,293,410 A | 3/1994 | Chen et al. |
| 5,389,026 A | 2/1995 | Fukuta et al. |
| 5,399,238 A | 3/1995 | Kumar |
| 5,445,550 A | 8/1995 | Xie et al. |
| 5,477,046 A | 12/1995 | Dietrich et al. |
| 5,528,099 A | 6/1996 | Xie et al. |
| 5,557,160 A | 9/1996 | Makishima et al. |
| 5,688,158 A | 11/1997 | Jones et al. |
| 5,747,815 A | 5/1998 | Young et al. |
| 5,773,921 A | 6/1998 | Keesmann et al. |
| 5,834,885 A | 11/1998 | Itoh et al. |
| 5,844,250 A | 12/1998 | Itoh et al. |
| 5,861,707 A | 1/1999 | Kumar |
| 5,929,557 A | 7/1999 | Makishima et al. |
| 5,939,823 A | 8/1999 | Kiyomiya et al. |
| 5,944,573 A | 8/1999 | Mearini et al. |
| 5,989,404 A | 11/1999 | Kiyomiya et al. |
| 6,057,172 A | 5/2000 | Tomihari |
| 6,087,766 A | 7/2000 | Janning |
| 6,116,975 A | 9/2000 | Saito et al. |
| 6,319,367 B1 | 11/2001 | Coates et al. |
| 6,362,574 B1 | 3/2002 | Aguero et al. |
| 6,394,871 B2 | 5/2002 | Lee |
| 6,414,442 B1 | 7/2002 | Janning |
| 6,459,206 B1 | 10/2002 | Aguero et al. |
| 6,495,953 B1 | 12/2002 | Imura |
| 6,517,403 B1 | 2/2003 | Cooper et al. |
| 6,554,673 B2 | 4/2003 | Pehrsson et al. |
| 6,577,130 B1 | 6/2003 | Adamo et al. |
| RE38,223 E | 8/2003 | Keesmann et al. |
| 6,617,587 B2 | 9/2003 | Parker et al. |
| 6,629,869 B1 | 10/2003 | Kumar et al. |
| 6,642,648 B1 | 11/2003 | Cooper |
| 6,707,236 B2 | 3/2004 | Pelrine et al. |
| 6,710,539 B2 | 3/2004 | Lee |
| 6,737,793 B2 | 5/2004 | Pehrsson et al. |
| RE38,561 E | 8/2004 | Keesmann et al. |
| 6,879,162 B2 | 4/2005 | Aguero et al. |
| 7,064,493 B2 | 6/2006 | Konishi |
| 7,070,634 B1 | 7/2006 | Wang |
| 7,141,983 B2 | 11/2006 | Liu et al. |
| 7,170,223 B2 | 1/2007 | Smith et al. |
| 7,279,085 B2 | 10/2007 | Hudspeth et al. |
| 7,307,379 B2 | 12/2007 | Iwamatsu et al. |
| 7,317,285 B2 | 1/2008 | Iwamatsu et al. |
| 7,326,328 B2 | 2/2008 | Hudspeth et al. |
| 7,332,714 B2 | 2/2008 | Watanabe et al. |
| 7,352,187 B2 | 4/2008 | Knapp et al. |
| 7,411,341 B2 | 8/2008 | Hudspeth et al. |
| 7,521,851 B2 * | 4/2009 | Tolt ................................. 313/311 |
| 7,741,852 B2 | 6/2010 | Watanabe et al. |
| 2001/0019241 A1 | 9/2001 | Srivastava et al. |
| 2002/0011770 A1 | 1/2002 | Kim et al. |
| 2004/0036402 A1 | 2/2004 | Keesmann et al. |
| 2004/0046491 A1 | 3/2004 | Piehl |
| 2004/0119021 A1 | 6/2004 | Parker et al. |
| 2008/0129178 A1 | 6/2008 | Hudspeth et al. |
| 2009/0153015 A1 | 6/2009 | King |
| 2009/0185660 A1 | 7/2009 | Zou et al. |
| 2009/0185661 A1 | 7/2009 | Zou et al. |
| 2010/0045212 A1 | 2/2010 | Mancevski |
| 2010/0181893 A1 | 7/2010 | Ousati Ashtiani |

FOREIGN PATENT DOCUMENTS

| | | |
|---|---|---|
| EP | 840345 A1 | 5/1998 |
| EP | 690467 B1 | 11/1999 |
| EP | 1100107 A2 | 5/2001 |
| EP | 957503 A3 | 10/2002 |
| EP | 1046186 B1 | 12/2002 |
| EP | 989580 A2 | 2/2003 |
| EP | 1019941 B1 | 9/2008 |
| WO | 8911157 A1 | 11/1989 |
| WO | 9420975 A1 | 9/1994 |
| WO | 9917330 A1 | 4/1999 |
| WO | 0131671 A1 | 5/2001 |
| WO | 0139243 A1 | 5/2001 |
| WO | 0192897 A3 | 12/2001 |
| WO | 03012819 A1 | 2/2003 |
| WO | 2006094687 A1 | 9/2006 |
| WO | 2009076291 A1 | 6/2009 |
| WO | 2009131754 A1 | 10/2009 |

OTHER PUBLICATIONS

Solano, et al., "7.2: High-field deuterium ion sources for neutron generators", 23rd International Vacuum Nanoelectronics Conference, Jul. 26-30, 2010, p. 106.

Spindt, et al., "11.1: A reliable improved Spindt cathode design for high currents", IEEE International Vacuum Electronics Conference, May 18-20, 2010, pp. 201-202.

Chichester, et al., "Development of a field desorption ion source for neutron generator applications," Nuclear Instruments and Methods in Physics Research B 261 (2007) 835-838, doi:10.1016/j.nimb.2007.04.105, pp. 835-838.

International Search Report and Written Opinion issued in PCT/US2013/075282 on Mar. 27, 2014, 7 pages.

* cited by examiner

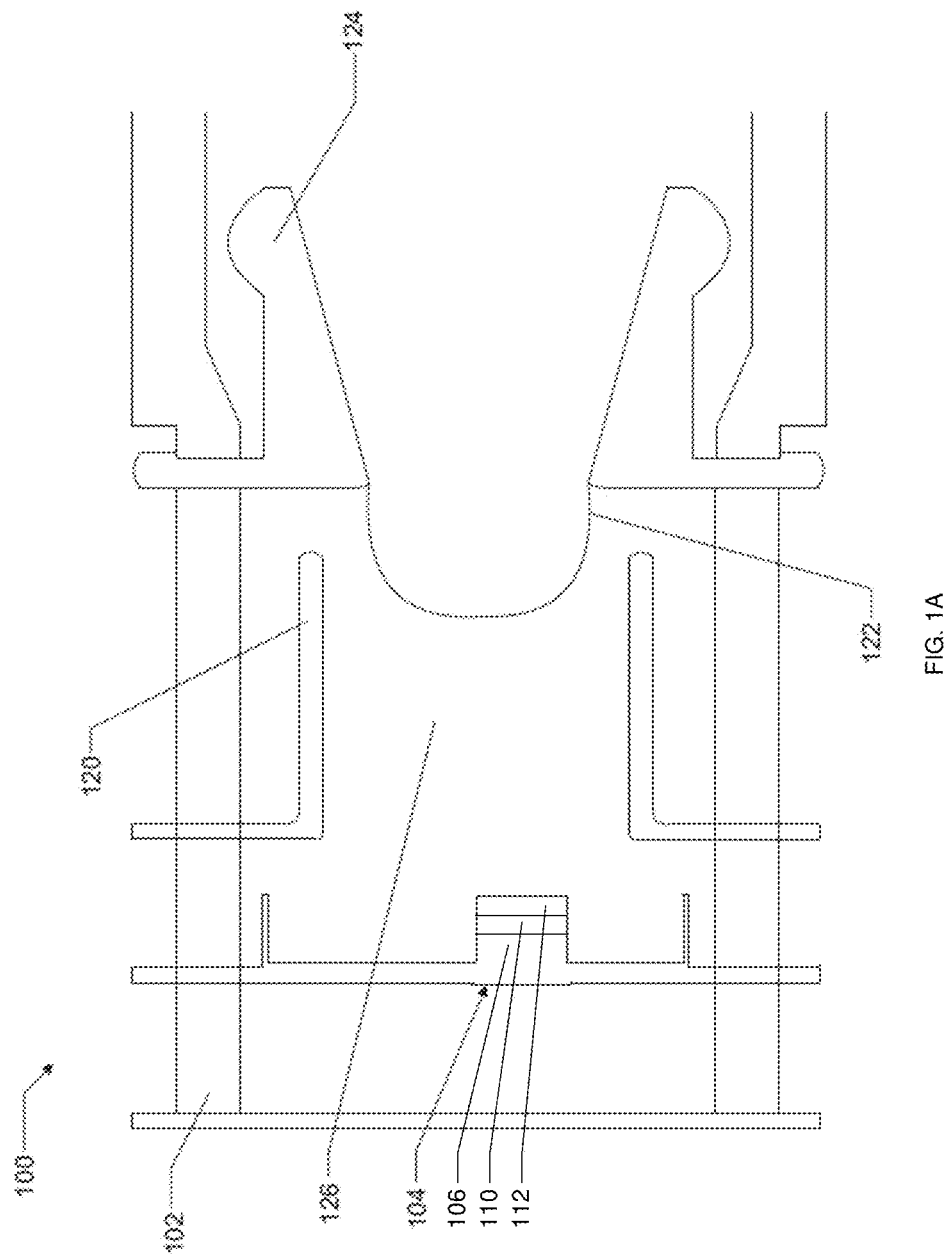

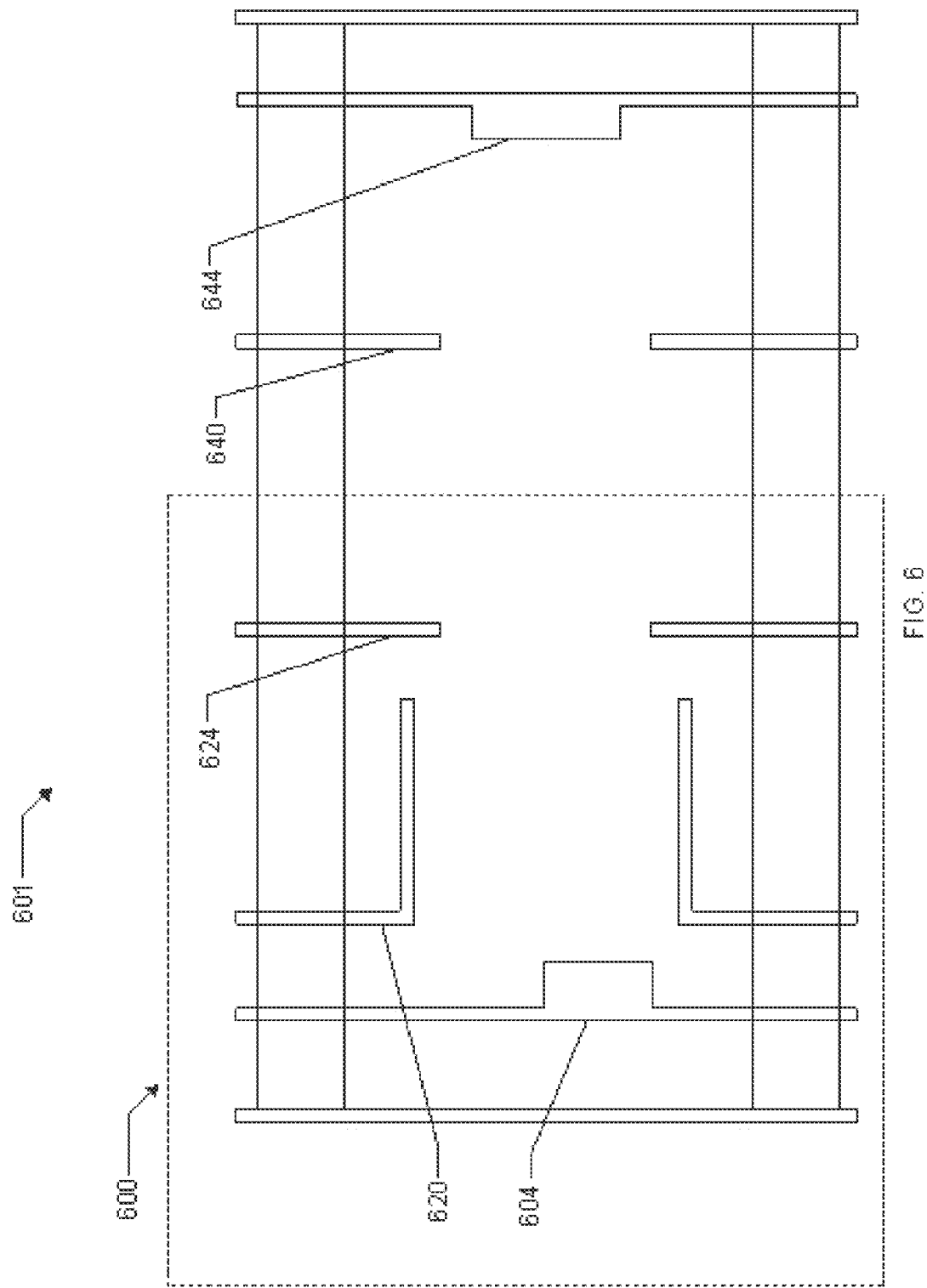

ION SOURCE WITH CATHODE HAVING AN ARRAY OF NANO-SIZED PROJECTIONS

FIELD OF THE DISCLOSURE

The present disclosure is related to the field of ion sources and, more particularly, to ion sources for use in particle accelerators and/or radiation generators.

BACKGROUND

Well logging instruments that utilize radiation generators, such as neutron generators, have proven incredibly useful in formation evaluation. Such a neutron generator may include an ion source and a target. An electric field is generated within the neutron generator that accelerates ions toward the target at a speed sufficient such that, when the ions are stopped by the target, neutrons are generated and directed into a formation into which the neutron generator is placed. The neutrons interact with atoms in the formation, and those interactions can be detected and analyzed in order to determine various pieces of information about the formation.

These neutron generators are not without drawbacks, however. For example, certain cathodes used in ion sources emit not only electrons, but also electrically conductive particles. These electrically conductive particles may build up on insulating surfaces inside the neutron generator, thereby changing the characteristics of those insulating surfaces. This may adversely affect the electric field inside the neutron generator, and consequently alter the focal point of the ion beam, which may result in the ion beam not striking the intended portion of the target. In addition, this may cause insulators to fail, such that electrical arcing occurs between electrodes. The foregoing degrades the performance of the neutron generator, and thus the performance of the well logging instrument utilizing the neutron generator.

In addition, such cathodes used in ion sources utilize ohmic heating in their operation. While this provides stable and copious electron generation, it also consumes an undesirably large amount of power for some applications. For example, in logging while drilling (LWD) applications, downhole power is often provided by a mud turbine, which while convenient, does not produce a large amount of power, and as such, power savings in such applications are highly desirable. In slickline applications, downhole power is often provided by a battery, and thus power savings are highly desirable as well, since the more power consumed in such applications, the shorter amount of time the instrument can be operated downhole.

As such, further advances in the area of ion sources are desirable. It is desired for such new ion sources to emit fewer electrically conductive particles, and to consume less power than ion sources utilizing ohmically heated cathodes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is an ion source for use in a particle accelerator. The ion source may include at least one cathode comprising an electrically conductive substrate that supports an insulating layer having an array of holes formed therein. An array of conductive nano-sized projections may be supported by the conductive substrate, with respective projections of the array of conductive nano-sized projections being positioned in corresponding holes of the array of holes. The insulating layer may support a second conductive layer having an array of holes formed therein, comprising an array of gates. The array of gates may be opposite the array of nano-sized projections. The array of nano-sized projections and the array of gates may have a first voltage difference such that a resultant electric field between respective projections and gates causes electrons to be emitted from the array of nano-sized projections and accelerated away from the at least one cathode. An ion source electrode may be downstream of the at least one cathode, and the at least one cathode and the ion source electrode may have the same voltage applied such that the electrons enter the space encompassed by the ion source electrode, some of the electrons as they travel within the ion source electrode striking an ionizable gas to create ions.

Also disclosed herein is a well logging instrument that may include a sonde housing, with a radiation generator carried by the sonde housing. The radiation generator may include an ion source. The ion source may include at least one cathode comprising an electrically conductive substrate that supports an insulating layer having an array of holes formed therein. An array of conductive nano-sized projections may be supported by the conductive substrate, with respective projections of the array of conductive nano-sized projections being positioned in corresponding holes of the array of holes. The insulating layer may support a second conductive layer having an array of holes formed therein, comprising an array of gates. The array of gates may be opposite the array of nano-sized projections. The array of nano-sized projections and the array of gates may have a first voltage difference such that a resultant electric field between respective projections and gates causes electrons to be emitted from the array of nano-sized projections and accelerated away from the at least one cathode. An ion source electrode may be downstream of the at least one cathode, and the at least one cathode and the ion source electrode may have the same voltage applied such that the electrons enter the space encompassed by the ion source electrode, some of the electrons as they travel within the ion source electrode striking an ionizable gas to create ions.

Further disclosed herein is a method of operating an ion source. The method may include generating electrons using at least one cathode by establishing a voltage difference between respective projections of an array of nano-sized projections positioned in corresponding holes of an array of holes in an insulating layer and an array of gates adjacent the array of nano-sized projections such that the resultant electric field causes electrons to be emitted from the array of nano-sized projections. The method may also include establishing a voltage difference between the array of gates of the at least one cathode and an extractor electrode downstream of the cathode. The method may also include generating ions via interactions between the electrons and an ionizable gas.

BRIEF DESCRIPTION OF THE DRAWINGS

FIG. 1A is a schematic cross-sectional view of an ion source for use with a radiation generator, in accordance with the present disclosure.

FIG. 6 is a schematic cross-sectional view of a radiation generator employing the ion source of the present disclosure.

DETAILED DESCRIPTION

Figure 1B:
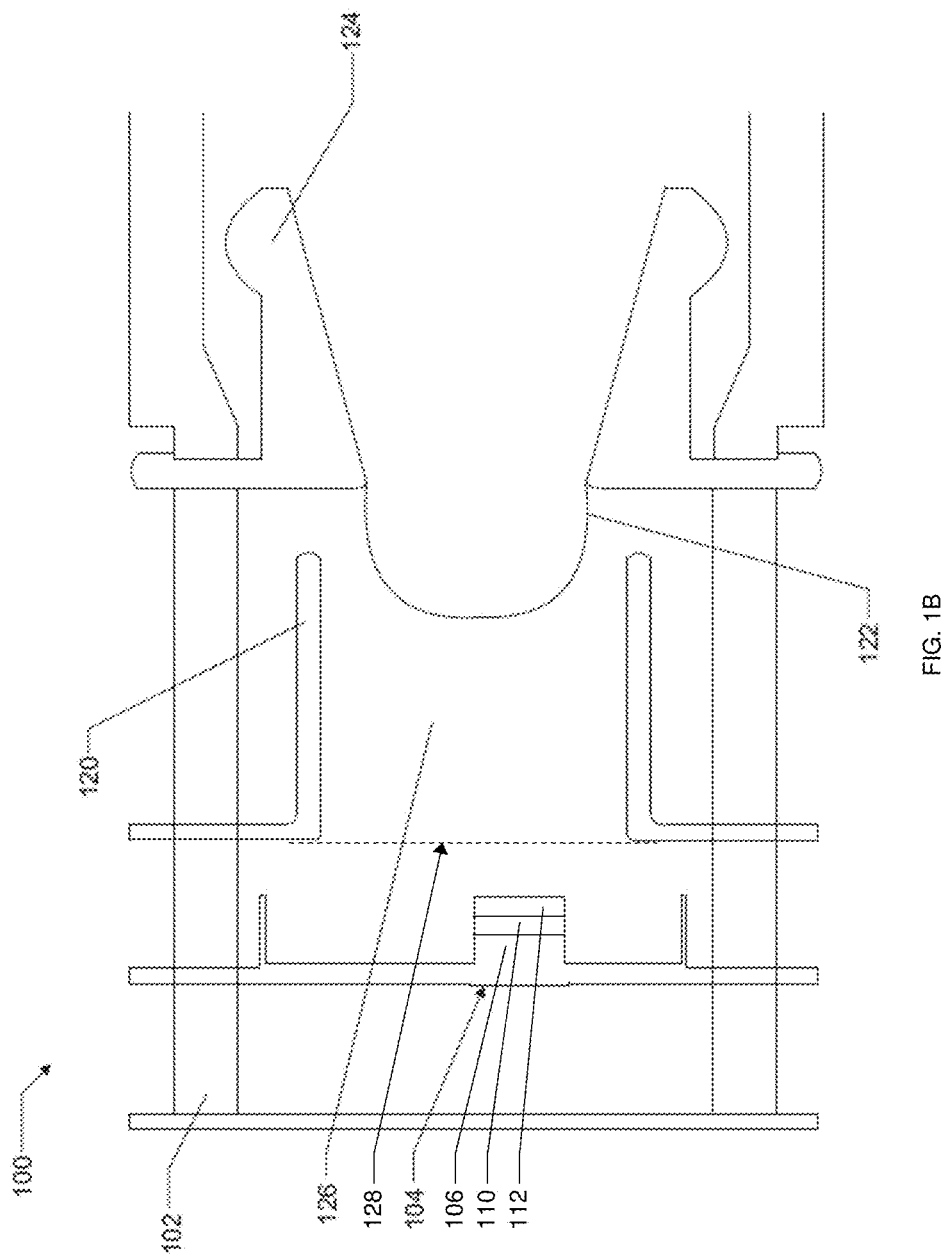
FIG. 1B is a schematic cross-sectional view of an alternative embodiment of an ion source for use with a radiation generator, in accordance with the present disclosure.

One or more embodiments of the present disclosure will be described below. These described embodiments are only examples of the presently disclosed techniques. Additionally, in an effort to provide a concise description, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. In FIGS. 1-4, and 6 elements separated by century are similar, although it should be understood that this does not apply to FIG. 5.

An ion source 100 for use in a radiation generator is now described with reference to FIG. 1A. The ion source 100 includes a portion of a hermetically sealed envelope, with an insulator 102 forming a part of the hermetically sealed envelope. The insulator 102 may be an insulator constructed from ceramic material, such as $Al_2O_3$. At least one ionizable gas, such as deuterium or tritium, is contained within the hermetically sealed envelope at a pressure of 2 mTorr to 20 mTorr, for example.

The ion source 100 includes a field emitter array cathode 104. An ion source electrode 120 is downstream of the cathode and an extractor electrode 124 is downstream of the ion source electrode 120. The ion source electrode 120 may be cylindrical in shape, but may also take other shapes. A domed grid 122 is coupled to the extractor electrode 124 and extends across the aperture in the extractor electrode. As will be understood by those skilled in the art, the ion source 120 may be used in a radiation generator (not shown). In such a case, additional electrodes as well as a target may be downstream of the extractor electrode 124.

Figure 2:
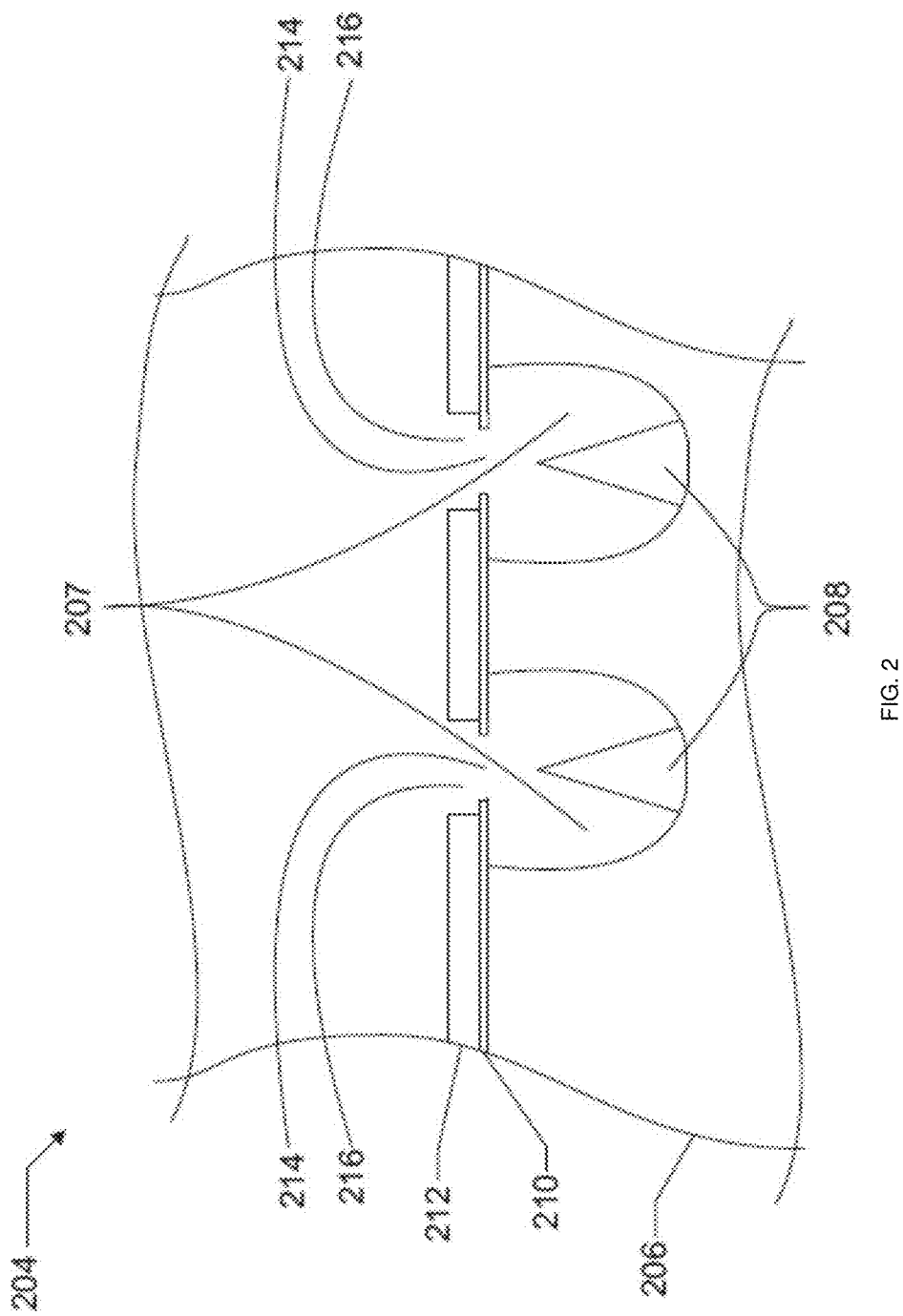
FIG. 2 is a greatly enlarged cross-sectional view of a portion of the cathode of the ion sources of FIGS. 1A, 1B, and 1C.

As best shown in FIG. 2, the cathode 204 comprises a substrate 206, also represented as items 106 in FIGS. 1A, 1B and 10, supporting an insulating layer 210 having an array of holes 207 formed therein. Each hole 207 of the array has a conductive nano-sized projection 208 of an array thereof positioned therein. By nano-sized, it is meant that the projections 208 have a height in a range of 1000 nm to 4000 nm and a diameter at the base in a range of 1000 nm to 2000 nm, for example. The projections 208 may have a generally conical shape, as shown, but may also take other shapes. For example, the projections 208 may be pyramidal, tubular, or rectangular in shape. It should be understood that the projections 208 may be constructed from suitable materials and that in some applications, the projections are not carbon nanotubes.

Figure 1C:
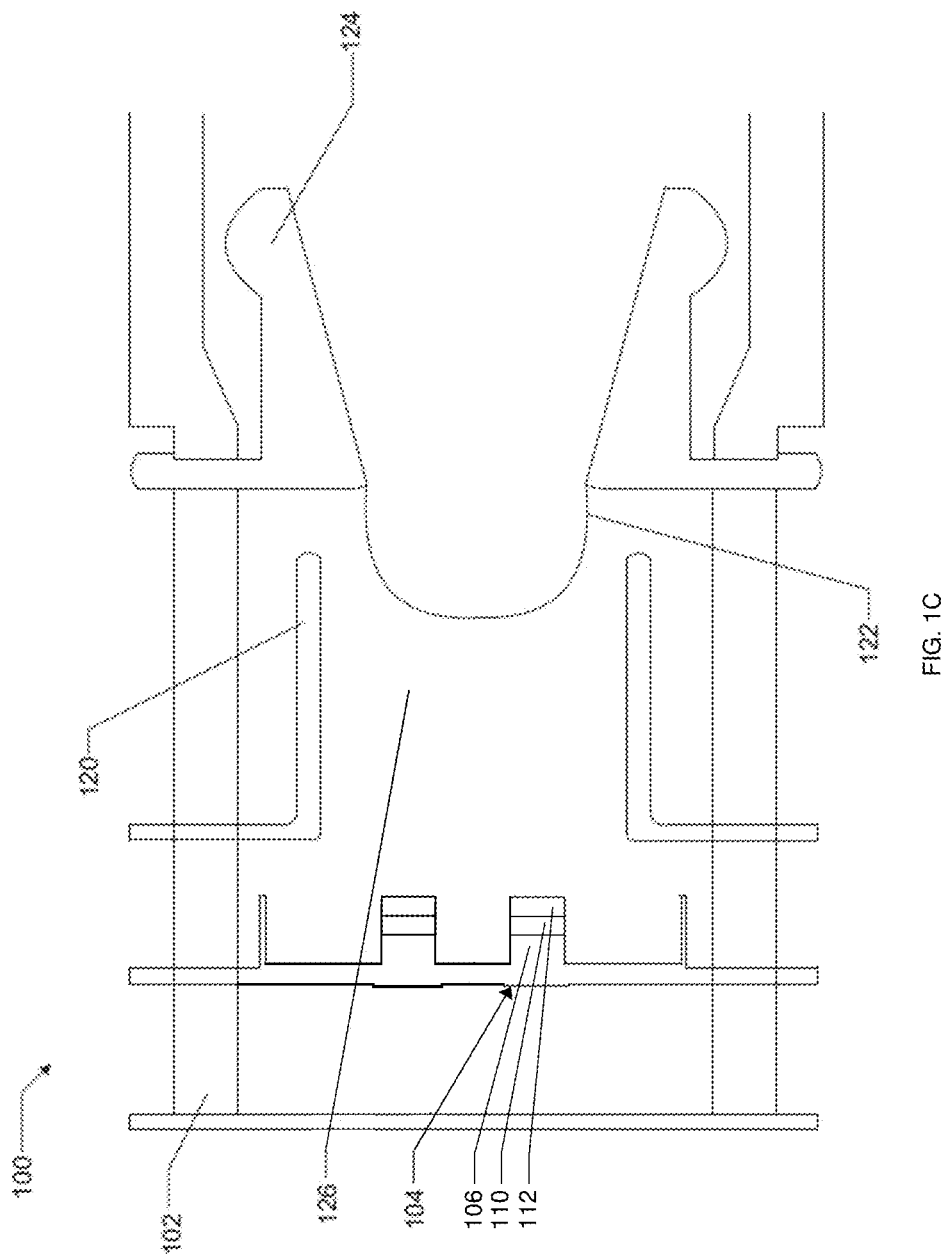
FIG. 1C is a schematic cross-sectional view of yet another embodiment of an ion source for use with a radiation generator, in accordance with the present disclosure.

An array of gates 212, also represented as items 112 in FIGS. 1A, 1B, and 1C, comprises a conductive layer supported by the insulating layer 210 and has holes 214 formed therein opposite the holes 207. The insulating layer 210 may have a thickness in the range of 50 nm to 100 nm, and the array of gates 212 may have a thickness in the range of 200 nm to 300 nm, for example. Those skilled in the art will appreciate that these thicknesses may be chosen so as to allow operation of the cathode 104 at specified voltages.

It should be appreciated that the specific configuration and thicknesses of the insulating layer 210, array of gates 212, and holes 207, 214 may vary from that which is described herein. As such, these variations are to be considered to be within the scope of the present disclosure.

Operation of the ion source will now be described. The array of nano-sized projections 208 and the array of gates 212 have a voltage difference such that the resultant electric field causes electrons to be emitted from the nano-sized projections. In particular, due to the shape of the nano-sized projections 208, the electric field is strong enough at the tips of the nano-sized projections that electrons leave the conduction band thereof and enter free space. This process is called field emission. Then, due to the voltage difference between the nano-sized projections 208 and the gates 212, the electrons are accelerated through the gates 212. The voltage difference between the nano-sized projections 208 and the gates 212 may have an absolute value of 200 V, for example, with the nano-sized projections 208 being at ground and with the gates 212 being at +200 V. As an alternative example, the nano-sized projections 208 may be at −200 V and the gates 212 at ground. This voltage difference is chosen such that the emitted electrons have sufficient energy to ionize deuterium and tritium gas and may have an absolute value in the range of 50 to 300 V. It should be appreciated that other voltage differences may be used as well.

Referring to FIG. 1A, the ion source electrode 120 may be at the same voltage as the cathode array of gates 112. Electrons emitted by the cathode 104 enter the space encompassed by the ion source electrode 120 and some of the electrons strike atoms of the ionizable gas to create ions. The ion source electrode 120 and the extractor electrode 124 have a voltage difference such that ions are accelerated toward the extractor electrode. The voltage difference between the ion source electrode 120 and the extractor electrode 124 may be less than the voltage difference between the cathode gates 112 and the nano-sized projections, for example with the nano-sized projections being at ground, the cathode gates being at +200 V and the extractor electrode being at +12 V.

The ions created are positive ions, and are accelerated through a domed grid 122 by the voltage difference between the ion source electrode 120 and the extractor electrode 124. The domed grid 122 may be at the same voltage as the extractor electrode 124 and serves to shape the electric field that accelerates the ions downstream. When the ion source 100 is used in a radiation generator, the ions may be further accelerated as they travel downstream until they strike a target, generating neutrons, for example.

Referring to FIG. 1B, in an alternative embodiment, the two functions of generating electrons at the nano-sized projections and accelerating those electrons to a suitable energy for ionization of gas may be separated and accomplished with the array of gates 112 and at least one additional electrode instead of only the array of gates used in the preferred embodiment. The additional electrode or electrodes, hereinafter referred to as the accelerating electrode(s), may comprise a grid 128, for example, placed in front of the array of gates 112 and mounted across the entrance aperture of the ion source electrode 120. The array of nano-sized projections and the array of gates 112 have a first voltage difference that is appropriate for the thickness of the insulating layer 110 and sufficient to produce field emission of electrons at the nano-tip projections. The array of gates 112 and the at least one accelerating electrode 128 have a second voltage difference of sufficient magnitude to accelerate the emitted electrons to an energy suitable for ionization of an ionizable gas.

The ion source electrode 120 may be at the same voltage as the at least one accelerating electrode 128. The ion source electrode 120 with the at least one accelerating electrode 128 and the extractor electrode 124 have a third voltage difference such that ions are accelerated toward the extractor electrode. The third voltage difference between the ion source electrode 120 with the at least one accelerating electrode 128 and the extractor electrode 124 may be less than the sum of the first and second voltage differences, for example, with the array of nano-sized projections being at ground, the array of gates 112 being at +10 V, the at least one accelerating electrode 128 being at +200 V, and the extractor electrode 124 being at +12 V.

Referring again to FIG. 1A, the ion source 100 may be configured to provide a pulsed output by switching the voltage applied to the cathode array of gates 112 between ground and its nominal operating voltage, e.g. +200V. Electrons, and thus ions, may then be generated while the voltage is at its nominal value, but not while the voltage is at ground. When the ion source 100 is operated in this fashion as part of a radiation source, the radiation source becomes a pulsed radiation source. In the alternative embodiment shown in FIG. 1B, a pulsed output may be achieved by switching the voltage applied to the accelerating electrode, the grid 128 for example, between ground and its nominal operating voltage, e.g. +200V.

Referring again to FIG. 1A, the cathode 104 may be positioned offset to a longitudinal axis of the ion source 100. This offset reduces the likelihood of the cathode 104 being struck by backstreaming electrons that may be produced when the ion source 100 is used in a radiation generator. Backstreaming electrons striking the cathode may cause localized heating, which in turn may cause evaporation of cathode material. The evaporated cathode material may be ionized and accelerated to the target, thereby damaging the target. In addition, the evaporated material may come from the nano-sized projections thereby reducing the sharpness of the nano-sized projections, reducing the electric field at the nano-sized projections and consequently reducing the emission of electrons from the cathode. Lastly, the evaporated material may condense on the insulating layer 110 within the cathode, forming a partially electrically conductive layer and reducing the effectiveness of the insulating layer. This too can lead to the loss of emission of electrons from the cathode.

Referring to FIG. 1A, in an alternative embodiment, to further guard against adverse effects from backstreaming electrons, to maximize electron emission area, and to provide redundancy in the event that a cathode fails, the cathode 104 offset from the longitudinal axis of the ion source may comprise multiple cathodes distributed around the longitudinal axis. In another alternative embodiment shown in FIG. 10, the cathode 104 may comprise a circular ring centered about the longitudinal axis.

Figure 4:
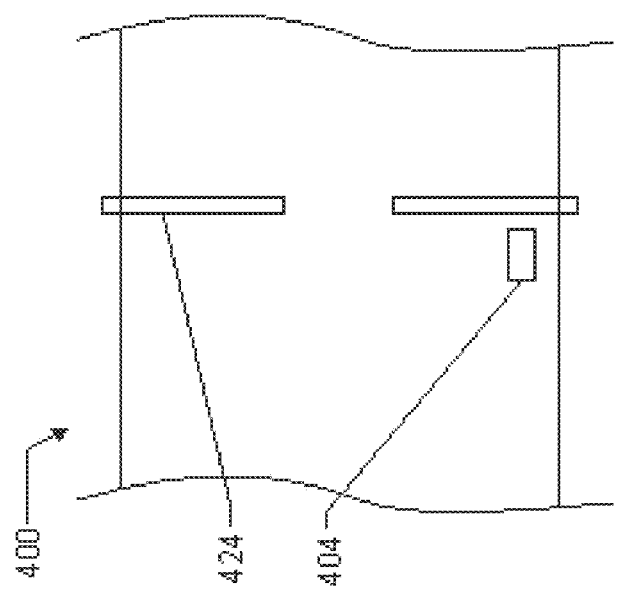
FIG. 4 is a simplified schematic cross-sectional view of another alternative configuration of the ion source disclosed herein.
Figure 3:
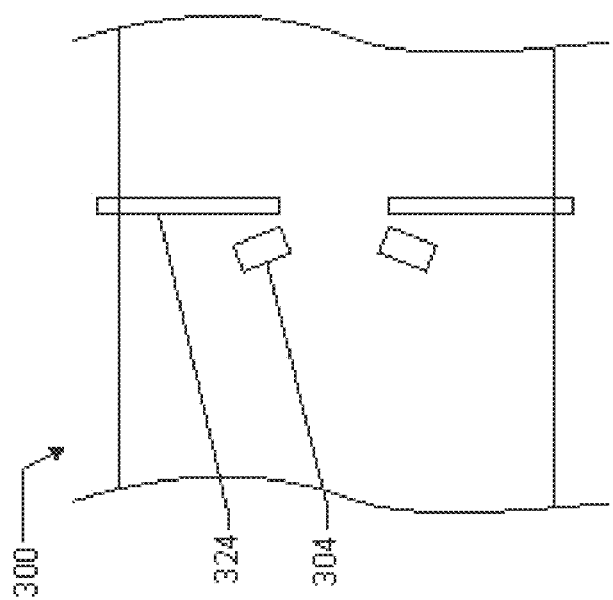
FIG. 3 is a simplified schematic cross-sectional view of an alternative configuration of the ion source disclosed herein.

Referring to FIG. 3, there may be multiple cathodes 304 positioned adjacent the extractor electrode 324, and indeed may be positioned on the circumference of the aperture in the extractor electrode. In this configuration, the cathodes 304 are mounted such that gates are angled away from the longitudinal axis in a range of 0° to 60°, so that they therefore emit electrons upstream, before the electrons turn and travel downstream due to the electric field in the ion source 300. The electrons therefore travel along a path of sufficient length for production of a suitable amount of ions, yet the ions generated have a relatively short distance to travel to exit the ion source 300. As shown in FIG. 4, in an alternative embodiment, at least one cathode 404 may be positioned adjacent the insulator.

The ion source design disclosed herein provides a variety of advantages. Some cathodes used in existing ion sources operate by being ohmically heated such that they emit electrons due to thermionic emission. While this may provide stable electron and thus stable ion generation, the ohmic heating consumes a significant portion of the power available to a well logging instrument. The ohmic heating also increases the operating temperature of the ion source, which can degrade operation. However, the ion source disclosed herein uses a cathode that does not rely on ohmic heating. Thus, the ion source disclosed herein consumes less power and has a lower operating temperature than ion sources in some existing designs.

In addition, ohmically heated cathodes used in some existing ion sources may emit undesirable electrically conductive particles during operation, and such electrically conductive particles can ultimately degrade the operation of those ion sources and the radiation generators into which they are installed. However, the cathode of the ion source disclosed herein does not emit such electrically conductive particles in an appreciable amount. Thus, the ion source disclosed herein may increase the lifespan of a radiation generator into which it is installed.

As has been stated, the ion sources described above can be used in a radiation generator. This is illustrated in FIG. 6, which shows a radiation generator 601 including an ion source 600 as described above. In addition to the components of the ion source 600 which have been described above and need no further discussion with reference to this application, the radiation generator 601 may include additional electrodes downstream of the extractor electrode 624 such as the suppressor electrode 640. There is a voltage difference between the extractor electrode 624 and the suppressor electrode 640 such that a resultant electric field in the radiation generator 601 accelerates the ions generated in the ion source 600 downstream toward a target 644. When the ions strike the target 644, neutrons may be generated.

Figure 5:
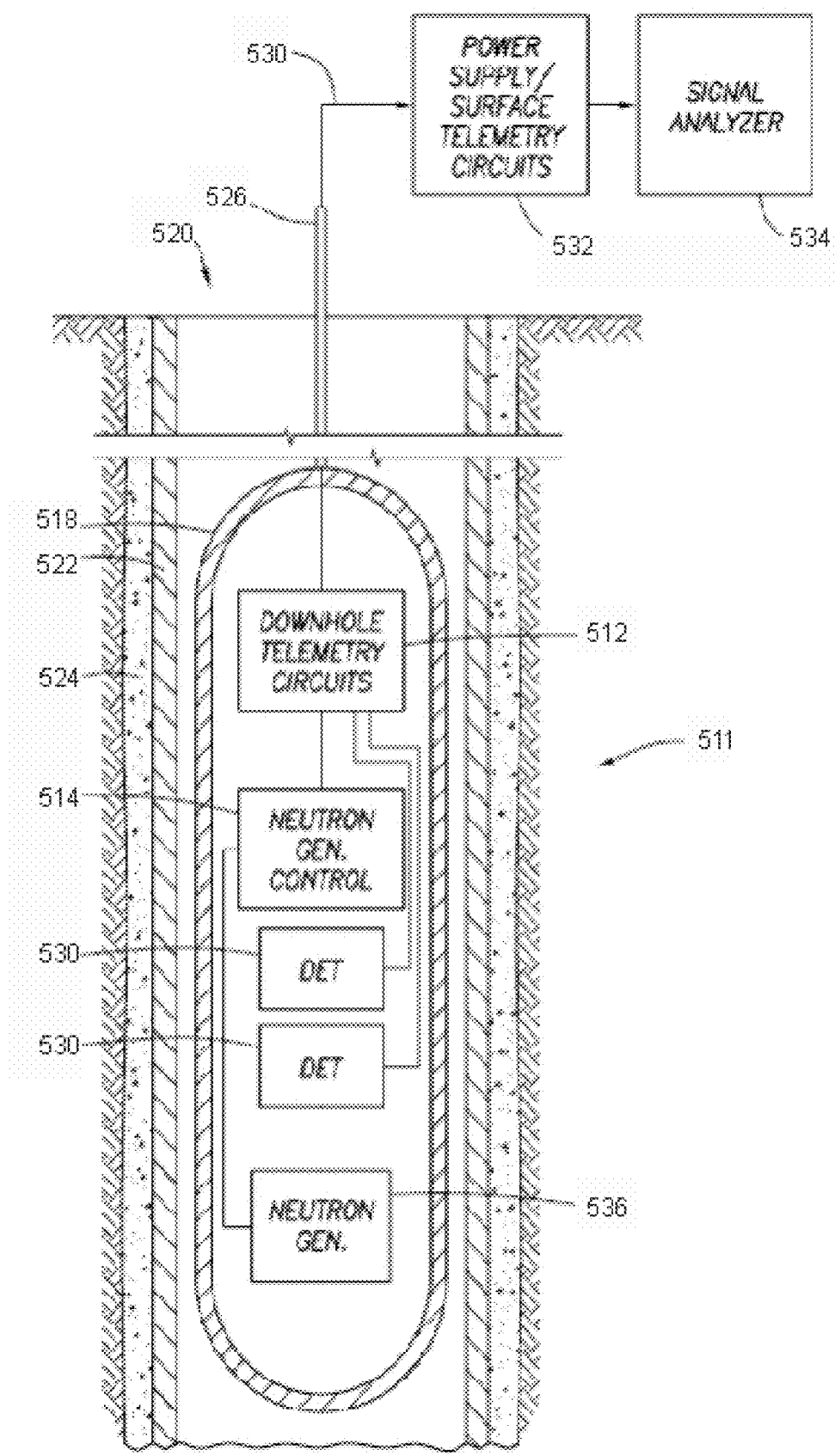
FIG. 5 is a schematic block diagram of a well logging instrument in which the ion sources of FIGS. 1A, 1B, and 1C may be used with a radiation generator employing the ion source of the present disclosure.

Turning now to FIG. 5, an example embodiment of a well logging instrument 511 is now described. One or more radiation detectors 530 are positioned within a sonde housing 518 along with a radiation generator 536 (e.g., neutron generator) and associated high voltage electrical components (e.g., power supply). The radiation generator 536 employs an ion source in accordance with the present invention and as described above. Supporting control circuitry 514 for the radiation generator 536 (e.g., low voltage control components) and other components, such as downhole telemetry circuitry 512, may also be carried in the sonde housing 518.

The sonde housing 518 is to be moved through a borehole 520. In the illustrated example, the borehole 520 is lined with a steel casing 522 and a surrounding cement annulus 524, although the sonde housing 518 and radiation generator 536 may be used with other borehole configurations (e.g., open holes). By way of example, the sonde housing 518 may be suspended in the borehole 520 by a cable 526, although a coiled tubing, etc., may also be used. Furthermore, other modes of conveyance of the sonde housing 518 within the borehole 520 may be used, such as wireline, slickline, Tough Logging Conditions (TLC) systems, and logging while drilling, for example. The sonde housing 518 may also be deployed for extended or permanent monitoring in some applications.

A multi-conductor power supply cable 528 may be carried by the cable 526 to provide electrical power from the surface (from power supply circuitry 532) downhole to the sonde housing 518 and the electrical components therein (i.e., the downhole telemetry circuitry 512, low-voltage radiation generator support circuitry 514, and one or more of the above-described radiation detectors 530). However, in other configurations power may be supplied by batteries and/or a downhole power generator, for example.

The radiation generator 536 is operated to emit neutrons to irradiate the geological formation adjacent the sonde housing 518. Gamma-rays and/or neutrons that return from the formation are detected by the radiation detectors 530. The outputs of the radiation detectors 530 are communicated to the surface via the downhole telemetry circuitry 512 and the surface telemetry circuitry 532 and may be analyzed by a signal analyzer 534 to obtain information regarding the geological formation. By way of example, the signal analyzer 534 may be implemented by a computer system executing signal analysis software for obtaining information regarding the formation. More particularly, oil, gas, water and other elements of the geological formation have distinctive radiation signatures that permit identification of these elements. Signal analysis can also be carried out downhole within the sonde housing 518 in some embodiments.

While the disclosure has been described with respect to a limited number of embodiments, those skilled in the art, having benefit of this disclosure, will appreciate that other embodiments can be envisioned that do not depart from the scope of this disclosure. Accordingly, the scope of the disclosure shall be limited only by the attached claims.

The invention claimed is:

1. An ion source for use in a particle accelerator comprising:
    at least one cathode comprising
        a substrate supporting an insulating layer having an array of holes formed therein,
        an array of nano-sized projections, respective projections of the array of nano-sized projections being positioned in corresponding holes of the array of holes, and
        an array of gates opposite the array of nano-sized projections and supported by the insulating layer,
        the array of nano-sized projections and the array of gates having a first voltage difference such that a resultant electric field between respective projections and gates causes electrons to be emitted from the array of nano-sized projections and accelerated away from the at least one cathode; and
    an ion source electrode downstream of the at least one cathode;
    the at least one cathode and the ion source electrode having the same voltage applied such that the electrons enter the opening of the ion source electrode, some of the electrons as they travel downstream through the opening of the ion source electrode striking an ionizable gas to create ions;
    an extractor electrode downstream of the ion source electrode;
    the ion source electrode and the extractor electrode having a second voltage difference such that the ions are accelerated toward the extractor electrode.

2. An ion source according to claim 1, wherein at least some gates of the array thereof and the insulating layer have holes formed therein opposite respective projections of the array of nano-sized projections.

3. An ion source according to claim 1, wherein ones of the array of nano-sized projections have a generally conical shape.

4. An ion source according to claim 1, wherein the at least one cathode is positioned offset to a longitudinal axis of the ion source.

5. An ion source according to claim 4, wherein the at least one cathode comprises a circular ring centered about the longitudinal axis.

6. An ion source according to claim 1, wherein the at least one cathode comprises a plurality thereof.

7. An ion source according to claim 1, wherein the at least one cathode is positioned adjacent the extractor electrode.

8. An ion source according to claim 1, wherein the first voltage difference results in an electron energy sufficient to ionize at least one of hydrogen gas, deuterium gas, and tritium gas.

9. An ion source according to claim 1, wherein the first voltage difference is between 50 V and 300 V.

10. An ion source according to claim 1, wherein the second voltage difference is less than the first voltage difference.

11. An ion source according to claim 1, further comprising at least one accelerating electrode positioned downstream of the array of gates, wherein the array of gates and the accelerating electrode have a third voltage difference.

12. A well logging instrument comprising: a sonde housing; a radiation generator carried by the sonde housing and comprising an ion source comprising at least one cathode comprising a substrate supporting an insulating layer having an array of holes formed therein, an array of nano-sized projections, respective projections of the array of nano-sized projections being positioned in corresponding holes of the array of holes, and an array of gates opposite the array of nano-sized projections and supported by the insulating layer, the array of nano-sized projections and the array of gates having a first voltage difference such that a resultant electric field between respective projections and gates causes electrons to be emitted from the array of nano-sized projections and accelerated away from the at least one cathode; and an ion source electrode downstream of the at least one cathode; the at least one cathode and the ion source electrode having the same voltage applied such that the electrons enter the opening of the ion source electrode, some of the electrons as they travel downstream through the opening of the ion source electrode striking an ionizable gas to create ions; an extractor electrode downstream of the ion source electrode; the ion source electrode and the extractor electrode having a second voltage difference such that the ions are accelerated toward the extractor electrode; a suppressor electrode downstream of the ion source; and a target downstream of the suppressor electrode; the extractor electrode and the suppressor electrode having a voltage difference such that a resultant electric field between the extractor electrode and suppressor electrode accelerates the ions generated by the ion source toward the target.

13. A well logging instrument according to claim 12, wherein the nano-sized projections have a generally conical shape.

14. A well logging instrument according to claim 12, wherein the first voltage difference results in an electron energy sufficient to ionize hydrogen, deuterium or tritium gas.

15. A well logging instrument according to claim 12, wherein the first voltage difference is between 50 V and 300 V.

16. A well logging instrument according to claim 12, wherein the second voltage difference is less than the first voltage difference.

17. A method of operating an ion source comprising:
generating electrons using at least one cathode by establishing a voltage difference between respective projections of an array of nano-sized projections positioned in corresponding holes of an array of holes in an insulating layer and an array of gates adjacent the array of nano-sized projections such that a resultant electric field causes electrons to be emitted from the array of nano-sized projections and accelerated away from the at least one cathode, wherein the at least one cathode is positioned offset to a longitudinal axis of the ion source; and
generating ions via interactions between the electrons and an ionizable gas.

18. A method according to claim 17, wherein the voltage difference results in an electron energy sufficient to ionize hydrogen, deuterium, or tritium gas.

19. A method according to claim 17, wherein the voltage difference is between 50 V and 300 V.

20. A method according to claim 17, wherein the nano-sized projections have a generally conical shape.

21. A method according to claim 17, wherein the at least one cathode comprises a plurality thereof.

22. A method of operating an ion source comprising:
generating electrons using at least one cathode by establishing a voltage difference between respective projections of an array of nano-sized projections positioned in corresponding holes of an array of holes in an insulating layer and an array of gates adjacent the array of nano-sized projections such that a resultant electric field causes electrons to be emitted from the array of nano-sized projections and accelerated away from the at least one cathode, wherein the at least one cathode is positioned adjacent the extractor electrode; and
generating ions via interactions between the electrons and an ionizable gas.

23. A method according to claim 22, wherein the voltage difference results in an electron energy sufficient to ionize hydrogen, deuterium, or tritium gas.

24. A method according to claim 22, wherein the voltage difference is between 50 V and 300V.

25. A method according to claim 22, wherein the nano-sized projections have a generally conical shape.

26. A method according to claim 22, wherein the at least one cathode comprises a plurality thereof.

* * * * *